US008915357B2

(12) United States Patent
Mecchella

(10) Patent No.: US 8,915,357 B2
(45) Date of Patent: Dec. 23, 2014

(54) TRANSFORMABLE CARRYING CASE

(75) Inventor: Monica Liane Mecchella, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 252 days.

(21) Appl. No.: 13/220,549

(22) Filed: Aug. 29, 2011

(65) Prior Publication Data

US 2013/0048517 A1   Feb. 28, 2013

(51) Int. Cl.
  *B65D 85/00* (2006.01)
  *A45C 11/00* (2006.01)
  *A45C 9/00* (2006.01)

(52) U.S. Cl.
  CPC ............. *A45C 11/00* (2013.01); *A45C 2200/15* (2013.01); *A45C 2011/003* (2013.01); *A45C 9/00* (2013.01); *G06F 2200/1633* (2013.01)
  USPC ......................... 206/45.23; 206/320; 206/45.2

(58) Field of Classification Search
  CPC ................... A45C 2011/002; A45C 2011/003; B65D 5/5206; B65D 5/52; B65D 5/5273; G06F 1/1613
  USPC .................. 206/320, 45.2, 45.23, 45.24, 751
  See application file for complete search history.

(56) References Cited

U.S. PATENT DOCUMENTS

| 5,377,794 | A | * | 1/1995 | Book ................................. 190/1 |
| 5,607,054 | A | * | 3/1997 | Hollingsworth .............. 206/320 |
| 7,545,634 | B2 | * | 6/2009 | Simonian et al. ........ 361/679.55 |
| D672,781 | S | * | 12/2012 | Lu ................................. D14/440 |
| 8,393,464 | B2 | * | 3/2013 | Yang et al. .................... 206/45.2 |
| 8,424,829 | B2 | * | 4/2013 | Lu et al. ......................... 248/371 |
| D687,438 | S | * | 8/2013 | Lu ................................. D14/440 |
| D690,702 | S | * | 10/2013 | Chung ......................... D14/440 |
| D691,145 | S | * | 10/2013 | Nam-Su ....................... D14/440 |
| D693,823 | S | * | 11/2013 | Chen et al. ................... D14/440 |
| 2004/0240164 | A1 | * | 12/2004 | Lee ................................ 361/683 |
| 2006/0285283 | A1 | * | 12/2006 | Simonian et al. ............. 361/679 |
| 2010/0089779 | A1 | * | 4/2010 | Bowers ......................... 206/320 |
| 2010/0294683 | A1 | * | 11/2010 | Mish et al. .................... 206/320 |
| 2012/0006951 | A1 | * | 1/2012 | Lin ............................. 248/188.6 |
| 2012/0181195 | A1 | * | 7/2012 | Lu et al. ........................ 206/320 |
| 2012/0305413 | A1 | * | 12/2012 | Chung ......................... 206/45.23 |
| 2013/0020214 | A1 | * | 1/2013 | Chiou .......................... 206/320 |
| 2013/0020216 | A1 | * | 1/2013 | Chiou .......................... 206/320 |
| 2013/0043148 | A1 | * | 2/2013 | Chen et al. ................. 206/45.23 |
| 2013/0134061 | A1 | * | 5/2013 | Wu et al. ...................... 206/320 |
| 2013/0146482 | A1 | * | 6/2013 | Huang ....................... 206/45.23 |

* cited by examiner

*Primary Examiner* — Steven A. Reynolds

(74) *Attorney, Agent, or Firm* — Lee & Hayes, PLLC

(57) ABSTRACT

A transformable carrying case includes a first cover and a second cover pivotably coupled to the first cover. The transformable carrying case may be transformable between at least three distinct positions including a closed position in which the first cover is disposed substantially on top of the second cover, an open position in which the first cover is substantially coplanar with the second cover, and a stand position in which the second cover is in a folded condition defining a prop surface to prop an object at an oblique angle relative to the first cover.

26 Claims, 8 Drawing Sheets

TRANSFORMABLE CARRYING CASE

BACKGROUND

Carrying cases provide a convenient way of transporting and protecting various objects, such as electronic devices, books, and the like. A wide variety of carrying cases exist for carrying a variety of different objects.

With some conventional carrying cases, a user places an object in the carrying case during non-use of the object, and removes the object from the carrying case and sets the carrying case aside during use of the object. For example, a user may store a laptop computer in a computer bag during non-use. When the user desires to use the laptop computer, the user may remove the laptop computer from the computer bag, set the laptop computer on a desk or other work surface, and place the computer bag out of the way.

With other conventional carrying cases, the carrying case may protect the object during non-use and may remain attached to the object during use. For example, some book covers protect the book during non-use. During use, the book cover may simply fold back to allow the user to read the book without completely removing the book cover.

However, neither of these types of conventional carrying cases is designed to aid in the use of the object. Rather, these conventional carrying cases must be stowed during use else they get in the way of convenient use of the object.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical items.

DETAILED DESCRIPTION

Figure 1A:
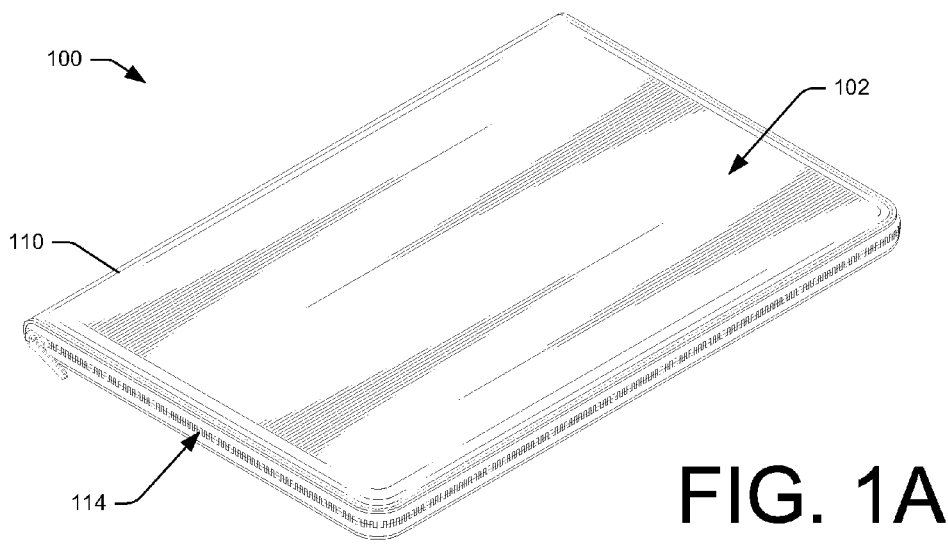
FIG. 1A and FIG. 1B are perspective views of an example transformable carrying case in a closed position.

As discussed above, carrying cases provide a convenient way to protect and transport objects, such as books and electronic devices. However, existing carrying cases are not designed to aid in the use of the devices. For example, existing carrying cases are not designed to support the object during use.

This disclosure describes a transformable carrying case that is designed not only to protect and transport objects, but also to support the objects during use. For example, transformable carrying cases according to this disclosure may be configured to transform into a "stand" position in which the carrying case is folded to prop an object at an oblique angle relative an underlying support surface. When in the stand position, the transformable carrying case acts much like an easel to hold the device. Transformable carrying cases according to this disclosure may be designed to support a variety of objects, such as electronic book reader devices, tablet computers, mobile devices, portable gaming devices, display screens, books, magazines, pictures, mirrors, or any other objects capable of being carried in a carrying case and propped on a stand.

In one example, a transformable carrying case according to this disclosure includes a first cover, and a second cover pivotably coupled to the first cover. The first cover in this example comprises a substantially planar sheet of material which defines a perimeter of the first cover. The second cover in this example comprises multiple substantially planar sheets of material which collectively define a perimeter of the second cover. In some embodiments, a flexible material surrounds and pivotably couples an edge of the first cover to an edge of the second cover. In that case, the flexible material further allows the multiple substantially planar sheets of the second cover to fold relative to one another. However, in other embodiments, the substantially planar sheets of material may be pivotably coupled to one another by other means (e.g., by being formed integrally with one another and having score lines, perforations, or thinner sections defining the bend lines).

In some embodiments, the transformable carrying case is transformable between at least three distinct positions including a closed position (for protecting and transporting an object), an open position (in which the object is accessible), and a stand position (in which the object is propped into a convenient position to use the object).

In the closed position, the first cover is disposed substantially on top of the second cover and substantially encloses the object. In some examples, the transformable carrying case may include a closure mechanism to secure the object within the transformable carrying case when the transformable carrying case is in the closed position. The closure mechanism may be any mechanism capable of holding the transformable carrying case in the closed position. By way of example and not limitation, the closure mechanism may include a zipper, a closure strap that surrounds all or part of the transformable carrying case, a snap closure, a hook and loop closure (e.g., Velcro®), a magnetic closure, a button closure, combinations of any of these, or the like.

In the open position, the closure mechanism is released and the transformable carrying case is laid open such that the first cover is substantially coplanar with the second cover. In this position, the object is exposed and accessible to a user. In the open position, the user may be able to hold the object for reading, viewing, or other use.

In the stand position, the second cover is in a folded condition defining a prop surface to prop an object at an oblique angle relative to the first cover. The first cover may lie flat on a desk, table, bed, or other support surface. In the stand position, the object may lean against the prop surface for reading, viewing, or other use. This may aid the user in the use of the object.

In some implementations, the second cover may include a latch to maintain the second cover in the folded condition when in the stand position. The latch may comprise any latching mechanism that is capable of releasably holding the transformable carrying case in the stand position. By way of example and not limitation, the latch may comprise a magnetic latch, a snap latch, threaded latch, a hook and loop latch, a clip latch, combinations of any of these, or the like.

Additional details of transformable carrying cases according to this disclosure are described below with reference to several example embodiments.

Example Transformable Carrying Case

Figure 1B:
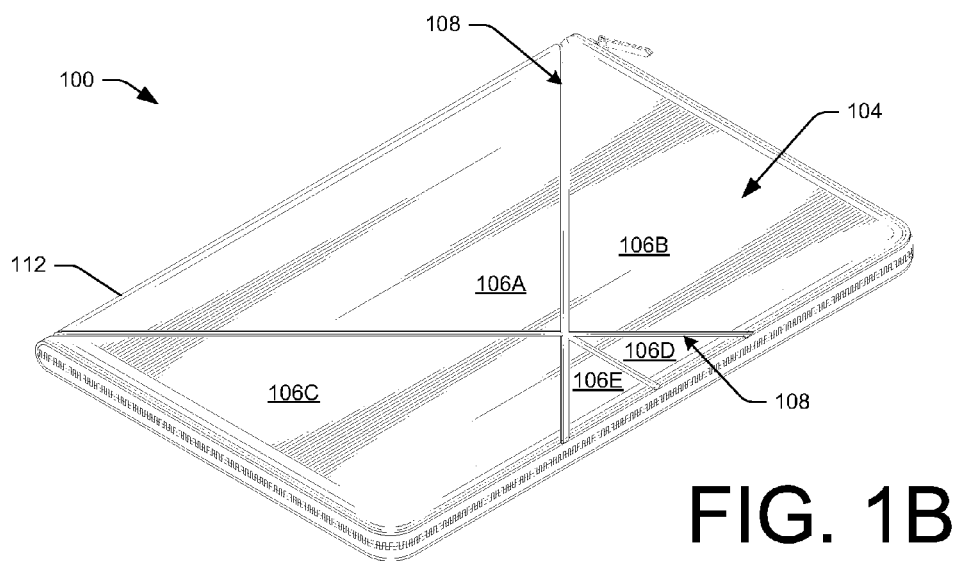

FIG. 1A and FIG. 1B illustrate an example transformable carrying case 100 according to this disclosure in a closed position. FIG. 1A is a perspective view of the transformable carrying case 100 with a first cover 102 face up. The first cover 102 comprises a substantially planar sheet of material which defines a perimeter of the first cover.

FIG. 1B is a perspective view of the transformable carrying case 100 with a second cover 104 shown face up. The second cover 104 comprises multiple substantially planar sheets of material 106A, 106B, 106C, 106D, and 106E (collectively referred to as 106), which collectively define a perimeter of the second cover 104. The multiple substantially planar sheets 106 of the second cover 104 are flexibly coupled together in a way that allows the multiple substantially planar sheets 106 to pivot or fold relative to one another along fold lines 108. In one example, the multiple substantially planar sheets 106 are coupled together by a flexible material that at least partially surrounds or covers the multiple substantially planar sheets 106. Such an example is described in detail below with reference to FIG. 5. By way of example and not limitation, the flexible material may comprise natural or synthetic fabric or sheets of material, foam, leather, faux leather, plastic, rubber, combinations of these, or other flexible materials. In some examples, the sheets of substantially planar material 106 may comprise separate individual pieces of material bonded, adhered, stitched, co-molded, ultrasonically welded, or otherwise affixed to the flexible material. In that case, the flexible material serves the dual purposes of holding the substantially planar sheets of material 106 in position relative to one another and of allowing the substantially planar sheets of material 106 to fold relative to one another along fold lines 108 and along a spine coupling the first cover 102 and the second cover 104. Additionally or alternatively, the multiple substantially planar sheets 106 may be joined directly to each other by stitching, sonic welding, adhesive, or the like.

In another example, the multiple substantially planar sheets 106 may be formed integrally and the fold lines 108 may represent score lines, thinned sections of material, perforations, weakened sections, living hinges, or other features designed to allow the multiple substantially planar sheets 106 to fold relative to one another.

In the example of FIG. 1B, the second cover 104 is shown to include five substantially planer sheets of material 106 which are arranged such that a size and shape of the perimeter of the second cover matches a size and shape of the perimeter of the first cover. However, in other embodiments, the second cover 104 may comprise more or fewer substantially planer sheets of material, in which case the second cover 104 may be configured to bend at different locations than those shown in FIG. 2. Moreover, in some embodiments, the second cover 104 need not necessarily match the size and shape of the perimeter of the first cover 102. Further, in some embodiments, the first cover 102 may additionally or alternatively comprise multiple substantially planar sheets of material such that the first cover may additionally or alternatively be foldable.

In one example, the substantially planar sheet of material which defines the perimeter of the first cover 102 and the multiple substantially planar sheets of material 106 which collectively define the perimeter of the second cover 104 comprise rigid or semi-rigid sheets of material. As used herein, a sheet of material is rigid or semi-rigid if it substantially holds its shape and resists deformation by its own weight when held by its edge. One specific example of a rigid or semi-rigid material that may be used is a 0.3 millimeter thick sheet of polycarbonate or polypropylene. However, numerous other materials and thicknesses may alternatively be used as described further below.

An edge 110 of the first cover 102 is pivotably coupled to an edge 112 of the second cover 104 at the spine of the transformable carrying case 100. In one example, the edge 110 of the first cover 102 is pivotably coupled to the edge 112 of the second cover 104 by a flexible material that at least partially surrounds the first cover 102 and the second cover 104. Such an example is described in detail below with reference to FIG. 5. In another example, the first cover 102 and the second cover 104 may be formed integrally and may be pivotable relative to one another around score lines, thinned sections of material, perforations, weakened sections, or other features designed to allow the first cover 102 to pivot relative to the second cover 104.

The transformable carrying case 100 may also include a closure mechanism to secure the object within the transformable carrying case when the transformable carrying case is in the closed position. In the example of FIG. 1A and FIG. 1B, the closure mechanism 114 is illustrated as a zipper. However, in other embodiments, the closure mechanism 114 may comprise any mechanism capable of holding the transformable carrying case in the closed position. By way of example and not limitation, alternative examples of closure mechanism 114 include a closure strap that surrounds all or part of the transformable carrying case, a snap closure, a hook and loop closure (e.g., Velcro®), a magnetic closure, a button closure, combinations of any of these, or the like.

Figure 2:
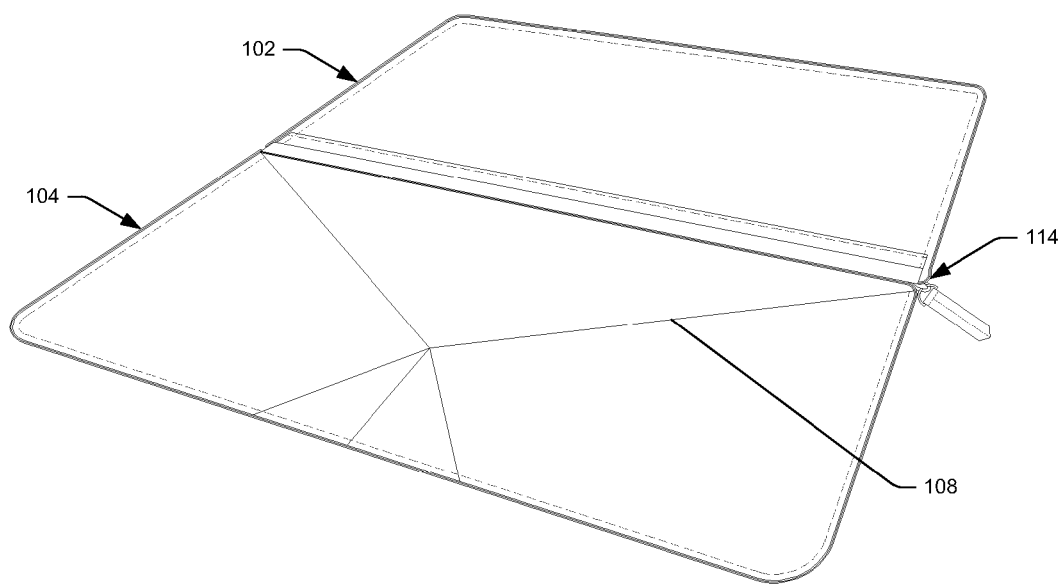
FIG. 2 is a perspective view of the example transformable carrying case of FIG. 1A and FIG. 1B in an open position.

FIG. 2 is a perspective view of the example transformable carrying case 100 in an open position. In the open position, closure mechanism 114 is released and the transformable carrying case 100 is laid open such that the first cover 102 is substantially coplanar with the second cover 104. In this view the object has been omitted for clarity. However, in this position, the object would be exposed and accessible to the user. For example, in this position, the user may be able to hold the object in the transformable carrying case 100 for reading, viewing, or other use.

Example Operation of Transformable Carrying Case

Figure 3:
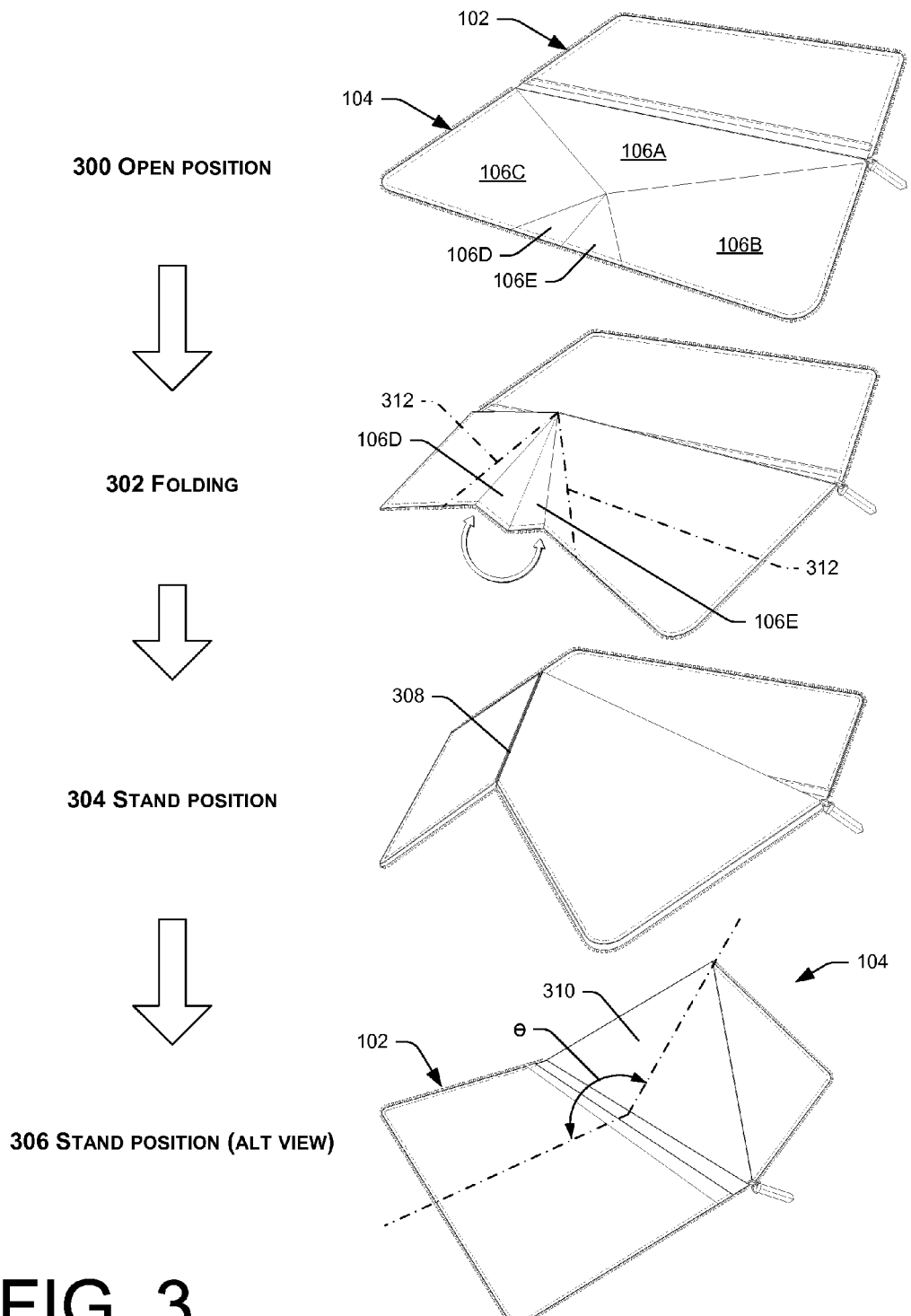
FIG. 3 depicts a sequence of views of the example transformable carrying case of FIG. 1A and FIG. 1B.

FIG. 3 depicts a sequence of views of the example transformable carrying case 100 in different positions. Specifically, the sequence of views shown in FIG. 3 begins after the transformable carrying case 100 is transitioned from the closed position shown in FIG. 1A to the open position shown in FIG. 2.

A first view 300 illustrates the transformable carrying case 100 in the open position, with the first cover 102 and the second cover 104 lying substantially coplanar with one another.

A second view 302 illustrates an act of folding the transformable carrying case 100 from the open position to a stand position by pinching or otherwise temporarily drawing together a portion of the second cover 104. Specifically, the transformable carrying case 100 may be transitioned from the open position to the stand position by pinching substantially planar sheets 106D and 106E together, thereby transforming the second cover 104 into a generally three-sided tent structure, where two corners of the second cover support the second cover 104 in the stand position.

A third view 304 illustrates the transformable carrying case 100 in the stand position, in which the second cover 104 is in a folded condition forming the generally three-sided tent structure. The generally three-sided tent structure of this embodiment is defined by three of the substantially planar sheets of material 106 making up the second cover 104, namely substantially planar sheets of material 106A, 106B, and 106C. Specifically, substantially planar sheet of material 106A is disposed adjacent to and pivotably coupled to substantially planar sheets of material 106B and 106C along fold lines (which define a first two edges of the generally three-sided tent structure). As substantially planar sheets 106D and 106E are pinched together as shown in the second view 302, internal edges of substantially planar sheets 106B and 106C are brought into contact at a ridge 308, which defines the third edge of the generally three-sided tent structure.

A fourth view 306 illustrates the transformable carrying case 100 in the stand position from an alternate vantage. In this view, the first cover 102 lies flat on a support surface, such as a desk, table, bed, or other surface, while the three-sided structure props the second cover 104 at an angle relative to the support surface. Specifically, the three-sided structure formed by the second cover 104 includes a prop surface 310 to prop an object at an oblique angle θ relative to the support surface. The angle θ may vary depending on an angle at which the object is desired to be propped. Generally, the angle θ may be any angle usable to prop an object for reading, viewing, or other use. In most embodiments, the angle θ may be at least about 10 degrees and at most about 90 degrees relative to the support surface. In some embodiments, the angle θ may be at least about 30 degrees and at most about 75 degrees. In the specific embodiment shown in FIG. 3, the angle θ is shown to be about 45 degrees. The transformable carrying case 100 may be held in the stand position by a latch (not visible in this figure), which maintains the substantially planar sheets 106D and 106E in the pinched, joined, or drawn-together condition. Details of various example latches are described with reference to FIG. 5 and FIGS. 6A-6D below.

Additionally, in some embodiments, the transformable carrying case 100 may be transformable into multiple different stand positions. In that case, the second cover 104 may include additional sheets of substantially planar material and/or additional fold lines. One example of such an embodiment is shown by optional fold lines 312 (shown in broken lines) in the second view 302. In this embodiment, the second cover 104 comprises seven substantially planar sheets of material, which allows the transformable carrying case 100 to be transformed into two different stand positions. Specifically, the transformable carrying case 100 may be transformed into a first stand position shown in views 304 and 306, as well as a second stand position (not shown) in which the second cover is folded at the optional fold lines 312, such that the substantially planar sheets 106B and 106C are pinched closer together to define a steeper three-sided tent structure. In this second stand position, the oblique angle θ between the prop surface 310 and the support surface would be greater than that shown in views 304 and 306 (i.e., the prop surface 310 forms a steeper angle relative to the support surface). Even further stand positions could be provided by including additional fold lines originating from the same or different points of origin at optional fold lines 312. The angles of the fold lines 108 may be chosen to position the prop surface 310 in angle(s) conducive to reading, viewing, or otherwise propping an object when in the stand position(s).

Figure 4A:
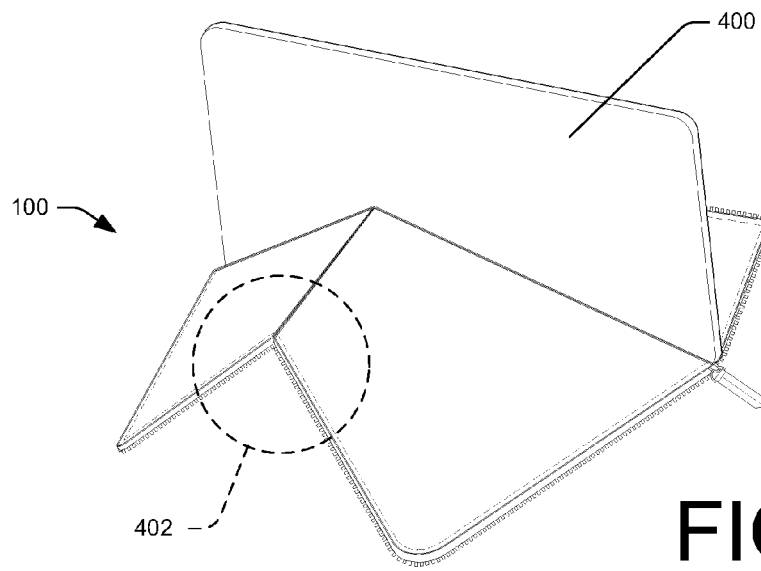
FIG. 4A and FIG. 4B are perspective views of the example transformable carrying case of FIG. 1A and FIG. 1B in a stand position, in which the carrying case is folded and is propping an object at an oblique angle relative to a support surface.
Figure 4B:
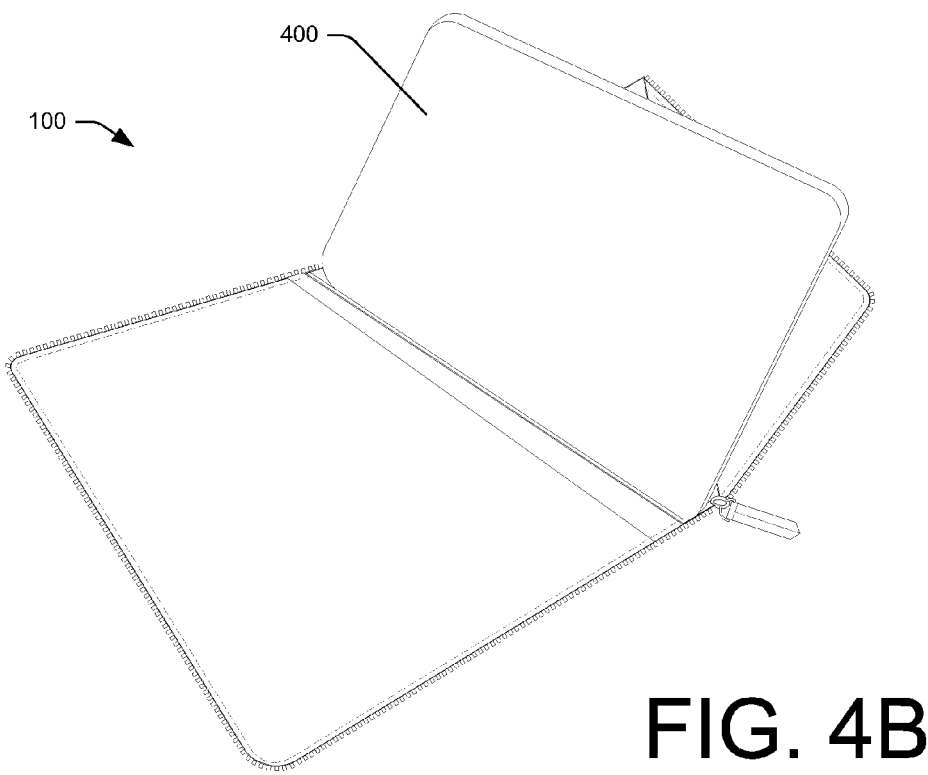

FIG. 4A and FIG. 4B are perspective views of the example transformable carrying case 100 propping an object 400 at an oblique angle relative to a support surface for reading, viewing, or other use. As noted above, the object may include any object capable of being carried in a carrying case and propped on a stand, including electronic book reader devices, tablet computers, mobile devices, portable gaming devices, display screens, books, magazines, pictures, and mirrors, for example.

FIG. 4A also illustrates a latch 402 of the transformable carrying case 100 that holds the transformable carrying case 100 in the stand position. Example embodiments of the latch 402 are illustrated in more detail in FIG. 5 and FIGS. 6A-6D. In addition to or instead of the latch 402, the transformable carrying case 100 may include other features to maintain the transformable carrying case 100 in the stand position. For example, the transformable carrying case 100 may include rubber or non-slip materials disposed at one or more locations (e.g., corners, edges, sides, and or surfaces) on the first cover 102 and/or the second cover 104. As another example, the transformable carrying case 100 may include a strap that extends between outer corners of the second cover 104. In that case, the strap may apply a tension force between the corners holding the transformable carrying case 100 in the stand position shown in FIG. 4A. In the closed position of FIG. 1, such as trap may also be stretched around the first cover 102 and the second cover 104 to serve as a closure mechanism to hold the transformable carrying case 100 in the closed position.

Figure 4C:
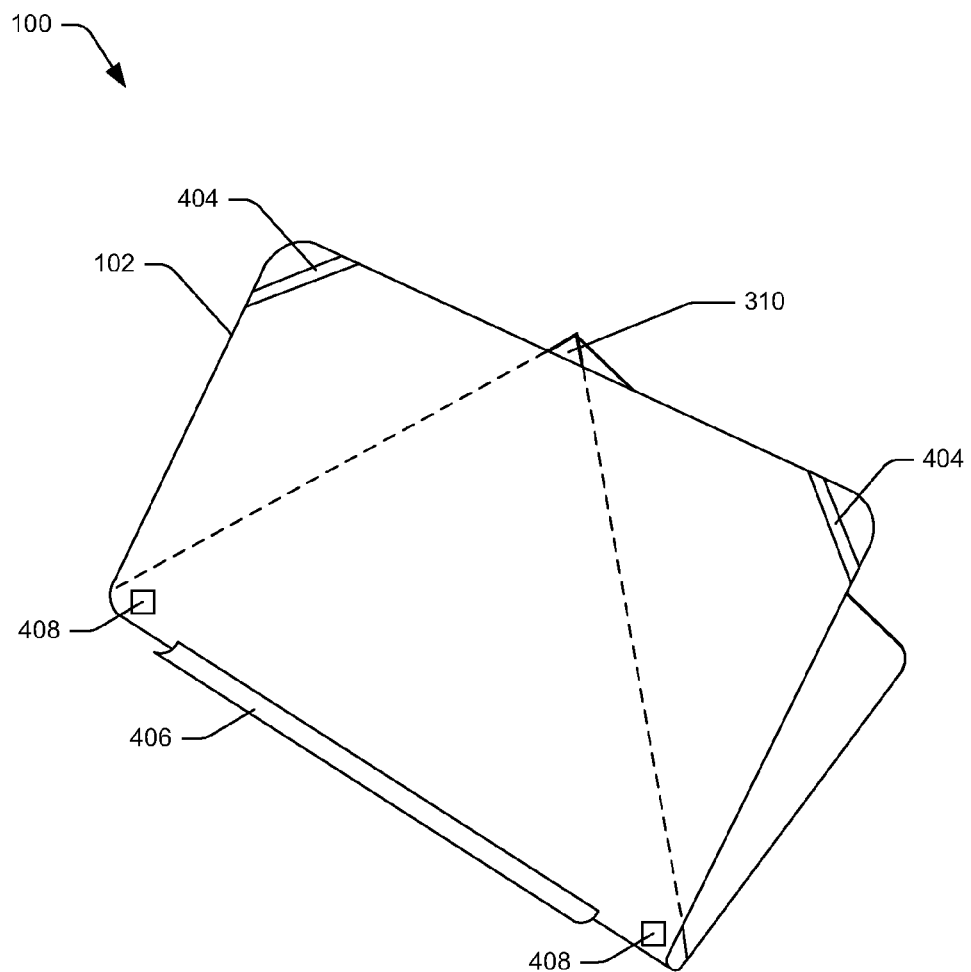
FIG. 4C is a simplified schematic view illustrating the transformable carrying case of FIG. 1A and FIG. 1B yet another position.

FIG. 4C is a simplified schematic view illustrating the transformable carrying case 100 yet another position. FIG. 4C illustrates the transformable carrying case 100 in a similar position to that shown in view 306 of FIG. 3, but with the first cover 102 folded up against the prop surface 310. In this example, the generally three-sided tent structure is mostly hidden behind the first cover 102, as shown by the broken lines in this figure. The object may then be rested against an outer surface of the first cover 102.

Alternatively, FIG. 4C may represent an alternate embodiment in which the transformable case is folded substantially inside out. That is, the upper/outer surface of the first cover 102 against which the object is configured to rest in the embodiment of FIG. 4C may be an interior surface of the transformable carrying case 100. In that case, the interior of the transformable carrying case 100 may include one or more attachment mechanisms to retain the object. Examples of attachment mechanisms that may be used to retain the object to the carrying case include, by way of example and not limitation, pockets or straps 404 to hold corners of the object, a tray or ledge 406 in which the object may rest, and/or other coupling mechanisms 408 usable to releasably couple the object to the transformable carrying case 100. By way of example and not limitation, the other coupling mechanisms 408 in this figure are meant to schematically represent hooks, snaps, latches, or other protruding members that engage complimentary features of the object, magnets in the case that attract ferromagnetic plates in the object or vice versa, hook and loop fasteners, or the like. Thus, in this embodiment, the transformable carrying case 100 may be transformed between and among any or all of its positions while still attached to the object.

Example Construction of Transformable Carrying Case

Figure 5:
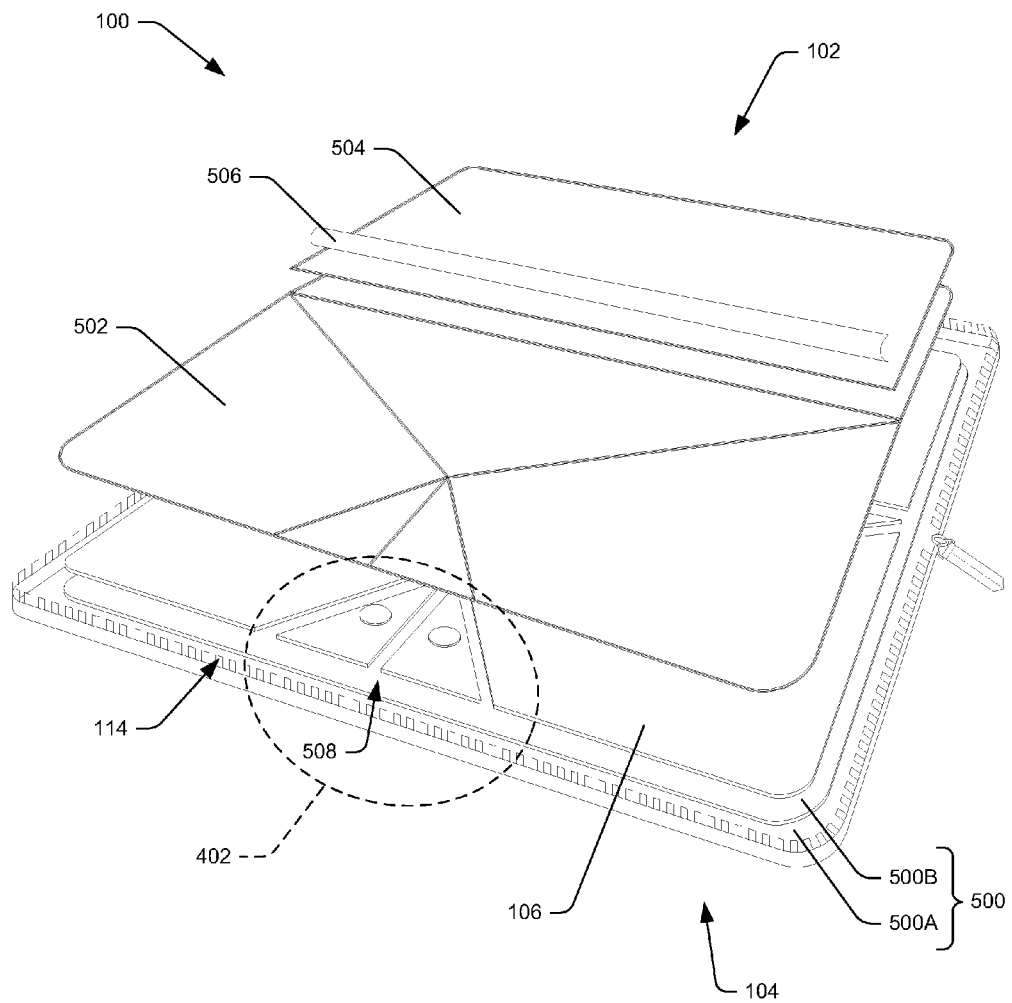
FIG. 5 is an exploded view of the example transformable carrying case of FIG. 1A and FIG. 1B in the open position.

FIG. 5 illustrates an exploded view of the example transformable carrying case 100. As shown in FIG. 5, the transformable carrying case 100 includes a flexible outer material 500 disposed on an outer surface of the substantially planar sheets of material 106. In the illustrated example, the flexible outer material 500 is a composite material comprised of a synthetic body fabric 500A bonded to a foam backing 500B. However, in other examples, the flexible outer material 500 may be formed of a single ply of material, multiple fabric layers, or different combinations in different areas or portions of the case. A flexible inner material 502 is disposed on an inner surface of the substantially planar sheets of material 106. The flexible inner material 502 may be constructed of the same or different material or combination of materials as the flexible outer cover 500. In one specific alternative embodiment, the flexible outer material 500 and/or the flexible inner material 502 may comprise rubber, silicone, or other flexible synthetic material co-molded with the substantially planar sheets of material 106.

A pocket 504 is coupled to an inner surface of the flexible inner material 502. A bumper or stop 506 is disposed along an opening of the pocket 504 near a connection of the first cover 102 with the second cover 104. The bumper or stop 506 abuts an object when it is resting against the prop surface (e.g., as shown in FIG. 4B) and prevents a bottom edge of the object from sliding away from the prop surface. Thus, the bumper or stop 506 helps maintain the object in a desired orientation for reading, viewing, or other use. In one example, the bumper or stop 506 may comprise a molded plastic ledge or shelf. However, in other examples, some other feature of case 100 may serve as a bumper or stop 506. For example, pocket 504 may include an edge detail (not shown) that is sufficiently substantial, e.g., formed from seam tape, piping, or the like, so as to serve as a bumper or stop.

FIG. 5 also illustrates one example of a latch 402 that may be used in connection with transformable carrying case 100. As shown in FIG. 5, the latch 402 comprises a magnetic latch 508 having a magnet and a ferromagnetic insert coupled to the substantially planar sheets of material 106D and 106E, respectively. When the substantially planar sheets of material 106D and 106E are pinched together as shown in FIG. 3, the magnet on the substantially planar sheet of material 106D attracts the ferromagnetic insert on the substantially planar sheet of material 106E and holds the second cover 104 in the stand position. The components of the magnetic latch 508 and the substantially planar sheets 106 may comprise other sizes, shapes, and/or configurations depending on, for example, the desired strength of the latch 508. In one alternate example, the magnetic elements could be sized and shaped to match the substantially planar sheets of material 106D and 106E. In that case, the magnetic elements could be used in lieu of the substantially planar sheets of material 106D and 106E. However, the magnetic latch 508 shown in FIG. 5 is just one example of a latch 402 that may be used.

Figure 6A:
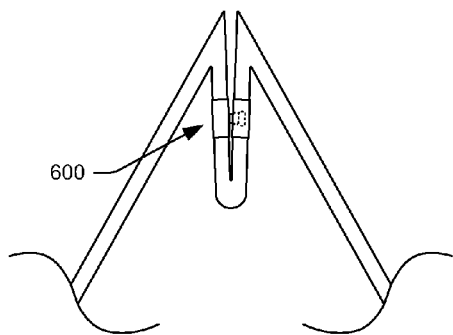
FIG. 6A, FIG. 6B, FIG. 6C, FIG. 6D, and FIG. 6E are detail views of example latches usable to hold the transformable carrying case of FIG. 1A and FIG. 1B in the stand position.

FIG. 6A-FIG. 6E are detail views of alternate examples of latches 402 that may be used to hold the transformable carrying case 100 in a stand position. FIG. 6A illustrates an example snap latch 600, in which male and female snap elements are disposed on substantially planar sheets of material 106D and 106E, respectively. When the substantially planar sheets of material 106D and 106E are pinched together as shown in FIG. 3, the male snap element fits in and is retained by the female snap element, thereby holding the second cover 104 in the stand position.

Figure 6B:
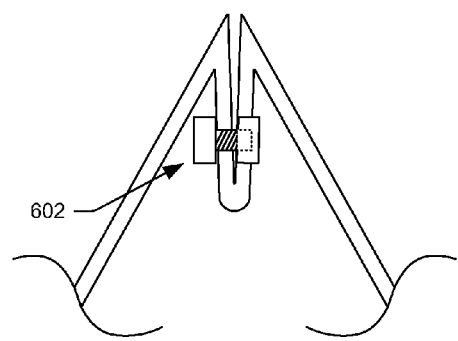

FIG. 6B illustrates an example threaded latch 602, in which male and female threaded elements are disposed on substantially planar sheets of material 106D and 106E, respectively. When the substantially planar sheets of material 106D and 106E are pinched together as shown in FIG. 3, the male threaded element threads into and is retained by the female threaded element, thereby holding the second cover 104 in the stand position.

Figure 6C:
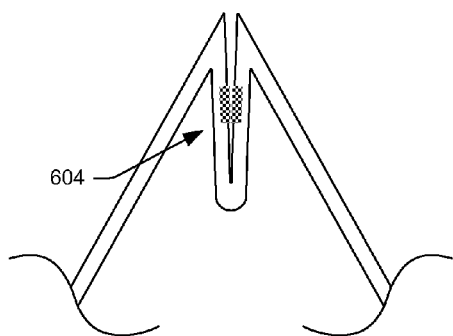

FIG. 6C illustrates an example hook and loop latch 604, in which hooks and loops are disposed on substantially planar sheets of material 106D and 106E, respectively. When the substantially planar sheets of material 106D and 106E are pinched together as shown in FIG. 3, the hooks engage and cling to the loops, thereby holding the second cover 104 in the stand position.

Figure 6D:
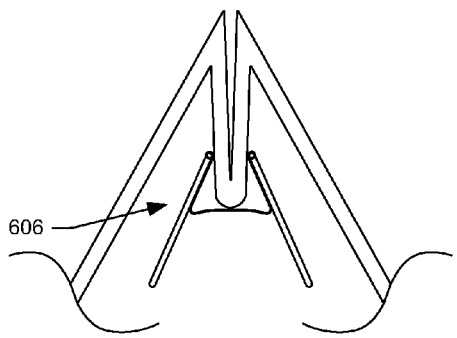

FIG. 6D illustrates an example clip latch 606, in which a clip pinches substantially planar sheets of material 106D and 106E together, thereby holding the second cover 104 in the stand position.

Figure 6E:
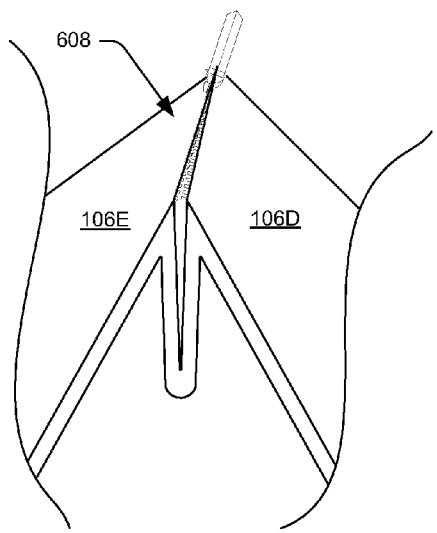

FIG. 6E illustrates a zipper latch 608, in which a zipper is disposed along a hypotenuse of the triangles defining substantially planar sheets 106D and 106E. When zipped, the zipper latch 608 holds the second cover 104 in the stand position. These and numerous other latches may be used alone or in any combination to retain the second cover 104 in the stand position.

Transformable carrying cases according to this disclosure may be made of a variety of different materials. By way of example and not limitation, the substantially planar sheets of material may be made of polycarbonate, polypropylene, polyethylene, polyvinyl chloride, or other plastics, metal, fiberglass, carbon fiber, wood, combinations of the foregoing or any other rigid or semi-rigid materials. Thickness of the substantially planar sheets of material may be chosen based on the size and shape of the transformable carrying case and the type of objects the transformable carrying case is intended to hold. The flexible inner material and the flexible outer material may be made of the same or different materials. By way of example and not limitation, the flexible inner and/or outer materials may be made of polyurethane, ethylene-vinyl acetate, foam rubber, silicone, polyethylene, nylon, microfiber, natural or synthetic cloth, leather, combinations of the foregoing or other flexible materials.

Figure 7A:
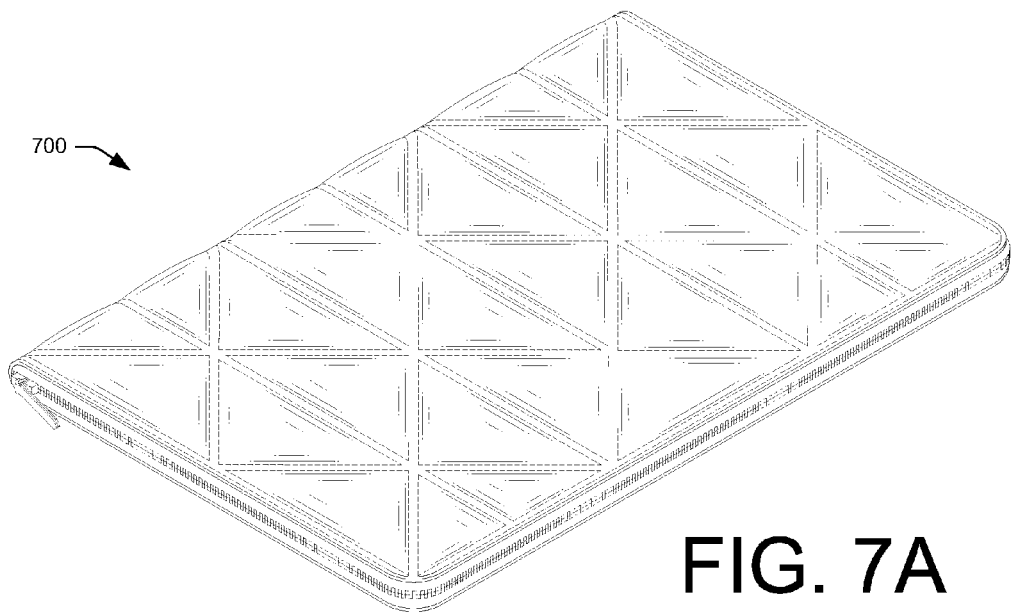
FIG. 7A and FIG. 7B are perspective views of another example transformable carrying case in a closed position.
Figure 7B:
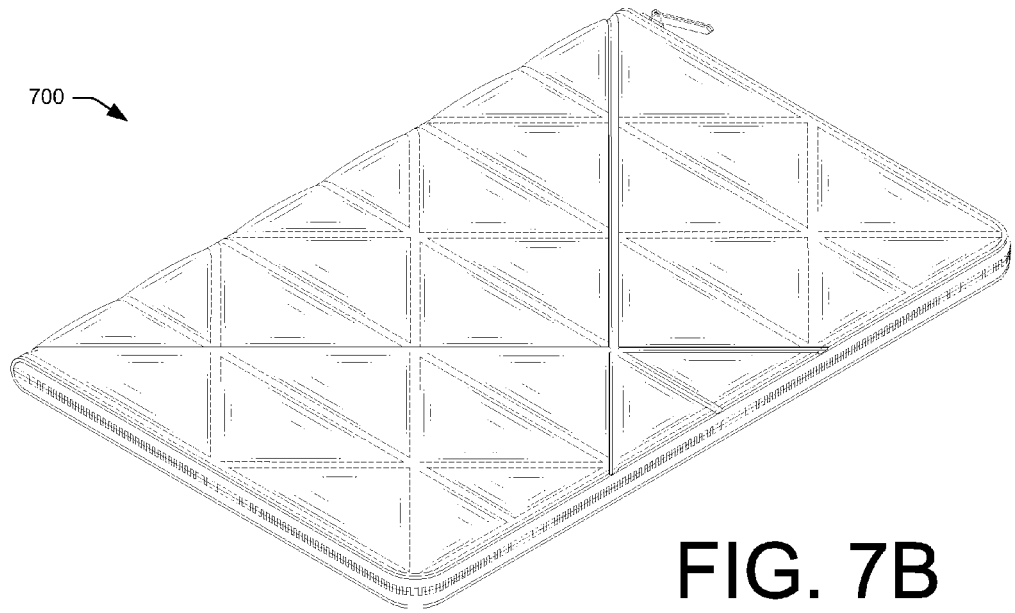

FIG. 7A and FIG. 7B are perspective views illustrating first and second covers, respectively, of a transformable carrying case 700 having one alternative flexible outer material. In this example, the flexible outer material comprises a faux leather body fabric made of polyurethane bonded to a foam backing made of ethylene-vinyl acetate. The flexible outer material is bonded or stitched so as to provide a quilted appearance. The flexible outer material of this embodiment may provide a sticky or tacky feeling to the transformable carrying case 700 allowing it to sit firmly on a support surface and to resist sliding. This may allow the transformable carrying case 700 to firmly prop an object at an oblique angle relative to the support surface for reading, viewing, or other use.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A transformable carrying case comprising:
 a first cover having a substantially planar sheet of material which defines a perimeter of the first cover; and
 a second cover having multiple substantially planar sheets of material which collectively define a perimeter of the second cover, an edge of the first cover being pivotably coupled to an edge of the second cover, such that the transformable carrying case is transformable from a closed position in which the first cover is disposed substantially on top of the second cover to a stand position in which the second cover is in a folded condition defining a first surface, a second surface and a third surface, wherein:
the first surface forms a triangular prop surface used to prop an object at an oblique angle relative to the first cover,
the second surface includes four sides with at least one side of the second surface being adjacent to the first surface and
the third surface includes four sides with at least one side of the third surface being adjacent to the first surface.

2. The transformable carrying case of claim 1, the second cover further comprising a magnetic latch to maintain the second cover in the folded condition when in the stand position.

3. The transformable carrying case of claim 1, further comprising a closure mechanism to secure the object within the transformable carrying case when the transformable carrying case is in the closed position.

4. The transformable carrying case of claim 1, wherein the multiple substantially planar sheets are maintained in the folded condition by a strap extended between a corner of the second surface and a corner of the third surface.

5. The transformable carrying case of claim 4, the substantially planar sheet of material which defines the perimeter of the first cover and the multiple substantially planar sheets of material which collectively define the perimeter of the second cover comprise rigid or semi-rigid sheets of material.

6. The transformable carrying case of claim 1, further comprising a flexible material surrounding the first cover and the second cover, the flexible material pivotably coupling the edge of the first cover to the edge of the second cover.

7. A transformable carrying case comprising:
a first cover; and
a second cover pivotably coupled to the first cover, the second cover comprising at least three edges,
the transformable carrying case being transformable between at least three distinct positions including:
a closed position in which the first cover is disposed substantially on top of the second cover,
an open position in which the first cover is substantially coplanar with the second cover, and
a stand position in which the second cover includes a prop surface to prop an object at an oblique angle relative to the first cover, wherein:
portions of an edge of the second cover are pinched together to form the stand position,
the edge of the second cover includes at least a side of a first substantially planar sheet of material of the second cover, a side of a second substantially planar sheet of material of the second cover, and a side of a third substantially planar sheet of material of the second cover and
the stand position comprises a first plane, a second plane and a third plane, the first plane serving as the prop surface.

8. The transformable carrying case of claim 7, the second cover including multiple substantially planar sheets of material, which in the stand position define a generally three-sided tent structure, wherein the prop surface props the object at a different oblique angle relative to the first cover, based at least in part on a length of the portions of the edge of the second cover that are pinched together.

9. The transformable carrying case of claim 7, the second cover further comprising a latch to maintain the second cover in the stand position.

10. The transformable carrying case of claim 9, the latch comprising a magnetic latch, a snap latch, a threaded latch, a hook-and-loop latch, a clip latch, or a zipper latch.

11. The transformable carrying case of claim 7, wherein:
the first substantially planar sheet of material of the second cover has a first triangular shape,
the second substantially planar sheet of material of the second cover has a second triangular shape and
the portions of the edge of the second cover are pinched together to form the stand position by bringing together a side of the first triangular shape and a side of the second triangular shape to form a ridge.

12. The transformable carrying case of claim 7, the first cover comprising a substantially planar sheet of material which defines a perimeter of the first cover, and the second cover comprising multiple substantially planar sheets of material which collectively define a perimeter of the second cover.

13. The transformable carrying case of claim 12, the multiple substantially planar sheets of material comprising five substantially planar sheets of material which are arranged such that a size and shape of the perimeter of the second cover matches a size and shape of the perimeter of the first cover.

14. The transformable carrying case of claim 12, the substantially planar sheet of material which defines the perimeter of the first cover and the multiple substantially planar sheets of material which collectively define the perimeter of the second cover comprise rigid or semi-rigid sheets of material.

15. The transformable carrying case of claim 7, further comprising a flexible material surrounding the first cover and the second cover, the flexible material pivotably coupling an edge of the first cover to an edge of the second cover.

16. The transformable carrying case of claim 15, the flexible material comprising natural or synthetic fabric or sheets of one or more of material, foam, leather, faux leather, plastic, or rubber.

17. The transformable carrying case of claim 15, the flexible material coupling together the multiple substantially planar sheets of material of the second cover.

18. The transformable carrying case of claim 7, the second cover comprising multiple substantially planar sheets of material coupled together and pivotable relative to one another by one or more living hinges.

19. A case comprising:
a first cover comprising a substantially planar sheet of material which defines a perimeter of the first cover;
a second cover comprising multiple substantially planar sheets of material which collectively define a perimeter of the second cover; and
a flexible material surrounding the first cover and the second cover, the flexible material pivotably coupling an edge of the first cover to an edge of the second cover, the flexible material further allowing the multiple substantially planar sheets of the second cover to fold relative to one another, such that in a folded position, the multiple substantially planar sheets of the second cover comprise three planes forming a three-sided tent structure, wherein:
portions of an edge of the second cover are pinched together to form the three-sided tent structure,
a first plane of the three planes includes three sides and is a prop surface to prop an object,
a second plane of the three planes includes four sides with at least one side of the second plane being adjacent to the first plane and a third plane of the three planes includes four sides with at least one side of the third plane being adjacent to the first plane.

20. The case of claim 19, the second cover further comprising a latch to maintain the second cover in the folded position.

21. The case of claim 20, the latch comprising a magnetic latch, a snap latch, a threaded latch, a hook-and-loop latch, a clip latch, or a zipper latch.

22. The case of claim 19, further comprising a closure mechanism to secure the object within the case when the case is in a closed position in which the first cover is disposed substantially on top of the second cover.

23. The case of claim 19, the multiple substantially planar sheets of material of the second cover comprising five substantially planar sheets of material which are arranged such that a size and shape of the perimeter of the second cover matches a size and shape of the perimeter of the first cover.

24. The case of claim 19, the substantially planar sheet of material which defines the perimeter of the first cover and the multiple substantially planar sheets of material which collectively define the perimeter of the second cover comprise rigid or semi-rigid sheets of material.

25. The case of claim 19, the flexible material comprising natural or synthetic fabric or sheets of one or more of material, foam, leather, faux leather, plastic, or rubber.

26. The case of claim 19, the flexible material coupling together the multiple substantially planar sheets of material of the second cover.

\* \* \* \* \*